May 18, 1943. C. W. HALL 2,319,733
ROTARY VALVE
Filed Sept. 5, 1942
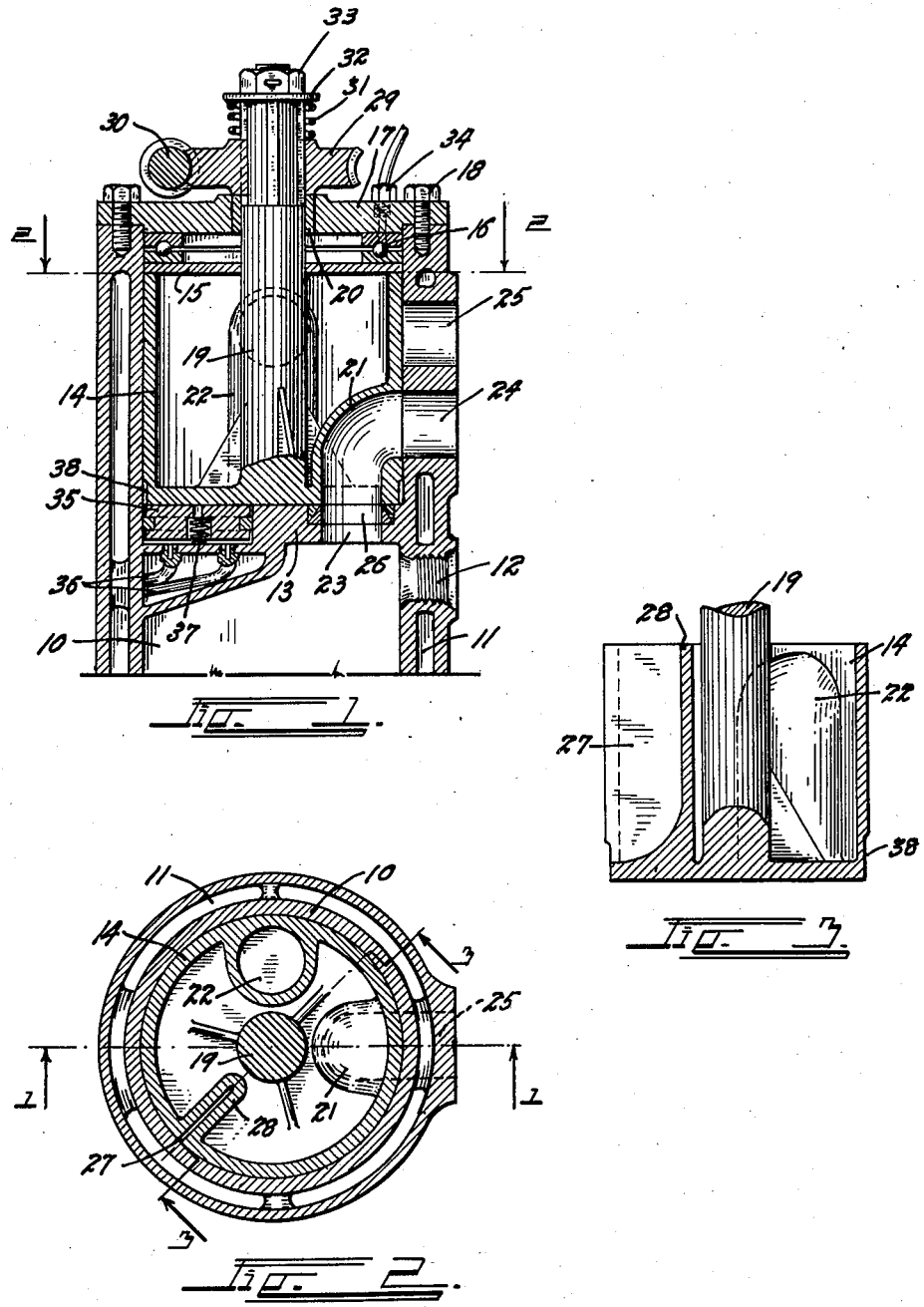
INVENTOR.
CHARLES W. HALL
BY
ATTORNEY Patented May 18, 1943

2,319,733

UNITED STATES PATENT OFFICE 2,319,733

ROTARY VALVE

Charles W. Hall, Denver, Colo., assignor to Malcolm S. Losey, Denver, Colo.

Application September 5, 1942, Serial No. 457,493

5 Claims. (Cl. 123—190)

This invention relates to a rotary valve for internal combustion engines. Valves of this type have not been heretofore exceedingly efficient due to the fact that it is difficult to obtain a perfect seal between the intake and exhaust ports on their cylindrical sides. If the valve is fitted sufficiently tight in the valve chamber to form a satisfactory seal at this point, expansion of the valve due to heat causes it to seize with resulting damage to the engine and valve. Another disadvantage of the usual rotary valve results from the fact that the valve becomes exceedingly hot and pre-heats the incoming gas to such an extent that the usual expansive power thereof is diminished.

The principal object of this invention is to provide a rotary valve in which all sealing surfaces will be absolutely tight and in which expansion of the valve will be automatically accommodated in all directions to prevent seizure.

Other objects of the invention are to so construct the valve that the incoming gases will travel a very short path through the valve so that they will not become pre-heated to an appreciable extent; to provide relatively thin walls around the gas passage; to eliminate storage of heat in the valve; to provide a resilient sealing contact for both the circumferential wall and at the end wall of the valve; and to provide means for lubricating the wearing surfaces of the valve with a constant circulation of oil which will remove heat from the valve.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a vertical section through the head of a typical internal combustion engine cylinder illustrating the improved valve therein;

Fig. 2 is a horizontal cross section through the valve chamber, looking downwardly on the line 2—2, Fig. 1; and Fig. 3 is a detail section through the valve, per se, taken on the line 3—3, Fig. 2.

In the drawing, an engine cylinder is indicated at 10 with its water jacket at 11 and spark plug opening at 12. The cylinder is provided with a head 13 which separates the power cylinder portion from a valve chamber thereon.

A hollow, cup-shaped, flat-bottomed, rotary valve 14 is rotatably mounted in the valve chamber with its flat bottom adjacent the cylinder head 11. The valve 14 comprises a flat circular bottom from which an open topped skirt rises. A flat, circular bearing disc 15 separates the upper edge of the skirt of the valve from an annular ball thrust bearing 16, which bears against a head plate 17 which is removably attached to the head of the valve chamber by means of suitable cap screws 18.

A valve shaft 19 is formed integrally with the bottom of the valve, or is suitably attached thereto. The shaft 19 rises axially vertically through the skirt of the valve and through a suitable bearing 20 in the head plate 17. The valve is provided with two gas tubes which will be herein designated the intake tube 21 and the exhaust tube 22. The tubes respectively communicate through the bottom of the valve and through the cylindrical skirt thereof. They are so arranged that their bottom openings alternately register with a cylinder port 23. The upper openings of the tubes are on different planes so that the intake tube 21 intermittently opens an intake port 24 and the exhaust tube opens an exhaust port 25 in the wall of the cylinder as the valve rotates. These tubes control the intake of gas to the cylinder and the exhaust of gases therefrom as is usual in rotary valve equipment.

The port 23 is sealed to the bottom of the valve by means of an axially-expansible sealing ring 26 which constantly maintains contact with the bottom of the valve. The side wall openings of the tubes are sealed to the side wall of the valve chamber by the novel construction of the valve skirt which enables it to constantly maintain close contact with the side wall of the valve chamber. To accomplish this the side wall or skirt is provided with a vertical slit 27, which renders it diametrically flexible. The valve is made slightly oversize and then contracted sufficiently to enable it to be inserted in the valve chamber. Thus, the skirt always exerts a lateral expansive force which maintains it snugly against the wall of the valve chamber and yet allows temperature expansion of the valve, by closure of the slit, without cramping or seizing.

If desired, the slit 27 in the valve may be a fully open slit in the skirt. It is preferred, however, to enclose the slit by means of an inwardly extending flange 28 on the inside of the skirt. The slit 27 extends into the flange 28, as shown in Fig. 3. This does not materially interfere with the elasticity of the skirt and prevents the entrance of gas, oil, grit, carbon, etc. into the interior of the valve.

The valve is rotated in any suitable manner, such as by means of a worm wheel 29 splined thereon above the plate 17. The worm wheel is driven from any suitable worm shaft 30, depending upon the arrangement of the particular engine.

A thrust spring 31 is positioned between the worm wheel 29 and a thrust washer 32 which is held on the upper extremity of the shaft by means of a suitable nut 33. This arrangement causes the valve shaft 19 to be constantly urged upwardly by the action of the spring 31 so as to maintain the valve against the circular plate 15 and to maintain the latter against the bearing 16. Thus, the valve does not rest on its bottom but the port 23 is sealed thereagainst by the expanding ring 26.

Oil may be applied to the bearing 16 in any suitable manner, such as by means of an oil tube 34. Oil is supplied to the bottom of the valve by means of a rotatable oiling button 35, as fully described in applicant's prior Patent No. 2,090,627. The oil to and from the oiling button is conveyed through oil circulation ducts 36 to lubricate and cool the valve. The button is constantly urged against the valve by means of a button spring 27.

It can be readily seen that there is no opportunity for the valve to expand in any direction to a dangerous seizing pressure. This is due to the fact that the skirt of the valve is resilient and to the fact that the valve floats on the spring 31 so that it has ample space for vertical expansion.

It can also be seen that the intake and exhaust tubes 21 and 22 are very short so that heating of the valve is reduced to a minimum and heating of the incoming gas is practically eliminated.

The slit 27 does not extend through the bottom of the valve therefore this bottom cannot accommodate expansion. It is necessary therefore to reduce the diameter of the valve around the bottom plate as shown at 38.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A rotary valve for internal combustion engines comprising: a cup-shaped valve having an open top and a closed bottom; gas conduits in said valve communicating from the bottom thereof through the side wall thereof; and a shaft extending concentrically from the bottom of the valve for imparting rotation thereto.

2. A rotary valve for internal combustion engines comprising: a cup-shaped valve having an open top and a closed bottom; gas conduits in said valve communicating from the bottom thereof through the side wall thereof; and a shaft extending concentrically from the bottom of the valve for imparting rotation thereto, the side wall of said valve being slit to allow for expansion and contraction.

3. A rotary valve for internal combustion engines comprising: a cup-shaped valve having an open top and a closed bottom; gas conduits in said valve communicating from the bottom thereof through the side wall thereof; a shaft extending concentrically from the bottom of the valve for imparting rotation thereto, the side wall of said valve being slit to allow for expansion and contraction; and a metallic flange extending radially inward from said slit, the latter extending partially into said flange.

4. A rotary valve for internal combustion engines comprising: a cup-shaped valve having an open top and a closed bottom; gas conduits in said valve communicating from the bottom thereof through the side wall thereof; a shaft extending concentrically from the bottom of the valve for imparting rotation thereto, the side wall of said valve being slit to allow for expansion and contraction; and the diameter of said valve about the bottom thereof being less than the normal diameter of the side walls thereof.

5. A rotary valve for internal combustion engines comprising: a cup-shaped valve having an open top and a closed bottom; gas conduits in said valve communicating from the bottom thereof through the side wall thereof; a shaft extending concentrically from the bottom of the valve for imparting rotation thereto, said valve being rotatable in a chamber adjacent the cylinder of an engine; a cylinder port extending from said cylinder through the bottom of said chamber with which said conduits alternately register; a lower gas port through the cylinder wall of said chamber with which one of said conduits registers; an upper gas port through the wall of said chamber with which the other of said conduits registers; a bearing plate resting against the open end of said valve; and spring means for urging said valve against said bearing plate.

CHARLES W. HALL.